United States Patent Office 3,053,658
Patented Sept. 11, 1962

3,053,658

PHOTOLITHOGRAPHY

Alexander Spencer, Kingsbury, London, England, assignor to Gestetner Limited, London, England, a British company No Drawing. Filed June 1, 1956, Ser. No. 588,623
Claims priority, application Great Britain June 9, 1955
1 Claim. (Cl. 96—33)

This invention relates to photolithography and particularly to a method of producing lithographic prints using offset lithographic printing plates.

Offset lithographic printing plates, often referred to as planographic printing plates, are well known. Generally they operate on the principle that areas of the plate are rendered oleophilic while the remaining areas are hydrophilic. On being alternately inked and wetted, the greasy ink is accepted only by the oleophilic areas and is offset on to a blanket whence it is transferred to paper to form the final print.

Such plates are known in which the surface is provided with a light-sensitive coating, e.g. a coating of a diazo compound, and processed so that a photographic image recorded in the coating is rendered as an oleophilic image, against an essentially hydrophilic background. Accordingly, in order to obtain a positive photographic image it must be recorded from a negative of the original subject. Since the image on the plate has to be made by contact printing, any variation in size of image, as compared with the original subject, must be effected when making the negative image of that subject.

It is an object of the present invention to provide a method, using light-sensitive offset lithographic printing plates on which an image of an original subject may be recorded, if desired by projection, and which will serve to provide positive prints of the image recorded, the necessity for making a negative being entirely eliminated.

According to the present invention a process for the production of offset lithographic prints comprises forming on a base having an oleophilic surface a photographic image in relief, the material of said image being substantially hydrophilic, etching the said material if desired in a manner known per se in lithography and employing said material in manner known per se for the production of offset lithographic prints.

It is possible, within the terms of this invention, to transfer an existing photographic image in hydrophilic medium on to an oleophilic support but it is generally preferred to form the required image on the support. For this latter purpose there is employed a material consisting of a support having an oleophilic surface and carrying a layer of a light-sensitive material which is hardened where exposed to light, directly or by a subsequent processing operation, the hardened areas of the layer being hydrophilic and the unhardened areas readily removable. In this latter case, the method comprises exposing the material to light to form the required image, and, if the image thus recorded is not directly hardened by the exposure light, processing said material to effect hardening of the exposed areas of the light-sensitive layer, removing the unhardened areas of the light-sensitive layer, etching the plate in a manner known per se in lithography, and using it in known manner to produce offset litho prints.

The base material may be of a kind which itself provides the necessary oleophilic surface or may be a material coated with an oleophilic surface layer. Thus, a film base, e.g. of cellulose derivative or synthetic resin or polymer, a metal base, e.g. aluminum, or a paper base, e.g. a wet-strengthened kraft paper, may be used. If the base itself does not provide an oleophilic surface a suitable oleophilic coating may be applied, e.g. a coating of an oleophilic synthetic resin such as polyvinyl acetate, poly(alkyl methacrylate), polystyrene, nylon, terylene, cellulose acetate, cellulose nitrate, chlorinated rubber, oil-modified alkyd resin, or mixtures of any of these alone or in conjunction with gelatin or other colloid.

Any light-sensitive material may be employed providing it gives either directly on exposure or as a result of subsequent processing a substantially hydrophilic hardened image, the unhardened areas of the coating being capable of ready removal. Preferably, according to the invention, the light-sensitive material is a colloid silver halide emulsion, e.g. a gelatino silver halide emulsion which is capable of being hardened on development with a tanning developer in a manner known per se. In this case the unhardened areas of the coating may simply be removed either by washing them away with warm water or by chemical treatment. However, other types of light-sensitive material including synthetic resinous materials which harden directly on exposure to light may be employed, with the proviso that the hardened material must still be substantially hydrophilic.

Since the light-sensitive material will usually be hydrophilic before hardening, a problem sometimes arises in that it is necessary to secure direct adhesion between the hydrophilic light-sensitive material and the oleophilic support. This problem is common in securing adhesion between gelatino silver halide emulsion layers and film supports in the production of photographic film and the methods which have been worked out in that field are directly applicable to the production of materials according to the present invention. These methods usually consist in the provision of a so-called "subbing" layer which has adherence both to the base and to the gelatin emulsion. In the production of materials according to the present invention, however, a subbing layer should be used which is essentially oleophilic in character, or if hydrophilic in character is capable of being readily removed.

In an alternative process of the present invention, therefore, the base of oleophilic surface may carry a substratum of gelatin and a layer of gelatino silver halide emulsion; in this case it is imagewise exposed, developed in a tanning developer, re-exposed to overall illumination, re-developed in a non-tanning developer and then treated with an etchbleach solution of character well known per se to remove the unhardened areas of the emulsion layer and of the areas of the substratum which lie thereunder.

By the use of the new offset printing materials of the present invention it is arranged that the exposed areas of the sensitive layer (corresponding to the high lights of the original subject) are rendered hydrophilic while the non-exposed areas (corresponding to the dark areas of the original subject) are removed, thus disclosing the oleophilic support. Accordingly, the printing areas (i.e. the oleophilic areas which accept greasy printing ink) are in intaglio with respect to the non-image areas. The ink is accordingly well held in these intaglio areas and plates so produced are capable of giving satisfactory copies.

The following examples will serve to illustrate the invention but are not to be regarded as limiting it in any way.

*Example I*

Cellulose triacetate film base is coated with a subbing layer formulated as follows:

| | |
|---|---|
| Chlorinated rubber ________ g__ | .36 |
| Mixture of equal volumes of xylene and benzene__cc__ | 160 |
| Short medium-oil-length tung/linseed oil modified alkyd sold under the trademark "Paralac N 19X" as 60% by weight solution in xylene________cc__ | 65 |

| | | |
|---|---|---|
| Polyvinyl acetate, 25% by weight solution in benzene | cc | 38 |
| Cyclohexanol | cc | 3 |
| Benzene | cc | 100 |

The subbing layer is dried and is then supercoated with a silver chloride photographic emulsion obtained by the precipitation of silver chloride in gelatine by means of potassium chloride, the quantities used being:

| | Grams |
|---|---|
| Silver nitrate | 90 |
| Potassium chloride | 58 |
| Gelatine | 187 |

After precipitation the emulsion is washed in a manner known per se and a minor proportion of potassium iodide (0.9 g.) is added to the emulsion before coating. There is also added a small proportion of optical sensitising dye to confer sensitivity in the green region of the spectrum and a small proportion of a stabiliser, e.g. mercapto benzthiazole. The emulsion, however, is unhardened.

The thus-coated film is exposed in a process camera to record an image of an original subject. It is then developed in a pyrocatechol developer to form a negative image containing silver in hardened gelatin. Preferably the development is halted by treatment with a stop bath e.g. of acetic acid. The film is then washed in warm water to dissolve away the unexposed areas of the emulsion and dried. There is thus obtained a negative record of the subject in hydrophilic relief and a complementary positive record of the subject in oleophilic intaglio.

The film is then treated with a lithographic etching solution of the formula:

| | | |
|---|---|---|
| Gum arabic | g | 20 |
| Ammonium dihydrogen phosphate | g | 40 |
| Glycerin | g | 400 |
| Water | cc | 1000 |

which serves to establish the required oleophilic-hydrophilic balance. The film is then used on an offset litho printing machine in the normal manner of a lithographic plate and yields copies of excellent quality.

*Example II*

Cellulose triacetate film base is provided with a gelatin substratum layer and then with a gelatino silver chloride emulsion layer, in manner known per se in the production of photographic film, the emulsion being of the character used in Example I.

The film is exposed and developed as in Example I. It is then re-exposed to overall illumination and re-developed in a non-hardening developer such as a developer based on p-methylaminophenol sulphate and hydroquinone. The film is then treated with an etch-bleach bath made up by mixing equal parts of solutions A and B which follows:

| | Grams |
|---|---|
| A: | |
| Copper sulphate | 120 |
| Citric acid | 150 |
| Potassium bromide | 7.5 |
| Water to make 1 litre. | |
| B: | |
| Hydrogen peroxide (10 volume). | |

By this treatment the unhardened emulsion and the gelatin sub-layer below the unhardened emulsion are removed leaving, as in Example I, a negative record of the subject in hydrophilic relief and a complementary positive record in oleophilic intaglio.

The film is then treated with lithographic etch as in Example I and used on an offset litho printing machine as in that example. It gives copies of excellent quality.

It may be observed that lateral inversion of the recorded subject may be corrected by the use of a prism on the process camera. Where transparent film base is used the prism can be dispensed with and the image recorded through the film base.

Where the hydrophilic negative record is not sufficiently hydrophilic it may be given an after-treatment to increase its hydrophilic character.

I claim:

A process for the production of an offset lithographic plate which comprises imagewise exposing a plate comprising a cellulose triacetate film base which is capable of accepting greasy printing ink, a chlorinated rubber subbing layer on said base and a layer of light-sensitive unhardened gelatino silver halide emulsion on said subbing layer, developing said plate in a developer which partially hardens the gelatin in the exposed areas while leaving the hardened gelatin hydrophilic in character, removing the unhardened gelatin by treatment of the plate with warm water thereby uncovering the oleophilic surface of the base in the unexposed areas, treating the plate with a lithographic etch comprising an aqueous solution of gum arabic, ammonium dihydrogen phosphate and glycerine, and inking the plate with greasy printing ink whereby the ink is held only in said uncovered oleophilic areas and a finished plate which retains the partially hardened gelatin areas is thereby produced.

References Cited in the file of this patent

UNITED STATES PATENTS

| | | |
|---|---|---|
| 1,042,827 | Schumacher | Oct. 29, 1912 |
| 1,472,048 | Christensen | Oct. 30, 1923 |
| 2,132,443 | Simons | Oct. 11, 1938 |
| 2,146,907 | Nadeau et al. | Feb. 14, 1939 |
| 2,178,338 | Frankenburger et al. | Oct. 31, 1939 |
| 2,367,420 | Muellen | Jan. 16, 1945 |
| 2,448,861 | Colt | Sept. 7, 1948 |
| 2,494,053 | Mitson et al. | Jan. 10, 1950 |
| 2,500,052 | Yackel | Mar. 7, 1950 |
| 2,568,503 | Kenyon et al. | Sept. 18, 1951 |
| 2,635,962 | Nadeau et al. | Apr. 21, 1953 |
| 2,694,639 | Nadeau et al. | Nov. 16, 1954 |

FOREIGN PATENTS

| | | |
|---|---|---|
| 648,897 | Great Britain | Jan. 17, 1951 |
| 793,550 | Great Britain | Apr. 16, 1958 |

OTHER REFERENCES

Rolf: Fibres, Plastics & Rubbers, Butterworth, 1956, pp. 27, 76, 159.

Mertle et al.: Photomechanics and Printing, Mertle Publishing Company 1957, page 281.

Tory: Photolithography, published by Assoc. General Publications, Sidney, Australia, Apr. 29, 1954, pp. 167 and 169.